United States Patent [19]
Kakinami et al.

[11] Patent Number: 5,096,287
[45] Date of Patent: Mar. 17, 1992

[54] VIDEO CAMERA FOR AN AUTOMOBILE

[75] Inventors: Toshiaki Kakinami; Tur Suto; Mitsuyoshi Saiki, all of Ibaragi, Japan

[73] Assignee: Aisin Seiki K.K., Aichi, Japan

[21] Appl. No.: 670,105

[22] Filed: Mar. 15, 1991

[30] Foreign Application Priority Data

Mar. 15, 1990 [JP] Japan .................. 2-64795

[51] Int. Cl.⁵ ............................................ G03B 29/00
[52] U.S. Cl. .................................... 352/132; 352/131
[58] Field of Search ............................ 352/131, 132

[56] References Cited

U.S. PATENT DOCUMENTS

| | | | |
|---|---|---|---|
| 1,945,112 | 1/1934 | Hogan | 352/132 |
| 2,457,236 | 12/1948 | Hokeit | 352/132 |
| 2,876,688 | 3/1959 | Laue | 352/132 |
| 4,063,258 | 12/1977 | Allen | 352/132 |
| 4,093,364 | 6/1978 | Miller | 352/132 |

Primary Examiner—Monroe H. Hayes
Attorney, Agent, or Firm—Sughrue, Mion, Zinn, Macpeak & Seas

[57] ABSTRACT

A video camera for an automobile is mounted on the arm which carries a rear view mirror. The camera is directed forwardly to take pictures through the front windshield of an automobile and a boot is connected between the camera and the windshield to isolate the camera lens from moisture and dust. An air duct may be connected between the boot and the air conditioner to provide a flow of air through the boot.

3 Claims, 3 Drawing Sheets

VIDEO CAMERA FOR AN AUTOMOBILE

BACKGROUND OF THE INVENTION

This invention relates to a video camera for an automobile, especially to a video camera mounted in an automobile to take pictures of the scenes ahead of the automobile.

A conventional video camera for an automobile is shown in, for example, Japanese Patent Publication 61-155908 (1986). This video camera provides pictures of the scenes ahead of the automobile to help the driver's view. Japanese Patent Publications 59-128693 (1984) or 61-135842 (1986) show a video camera to detect obstacles or white lines along the side of the road to enhance the safety and comfort of driving. Japanese Patent Publication 64-15606 (1989) shows a device which calculates the distance to an automobile driving ahead.

Video camera shown in the above mentioned patent publications are mounted outside the automobile. If a video camera is mounted outside the automobile, there may be problems due to snow, rain or dirt. On the other hand, if a video camera is mounted in the automobile, to avoid direct problems caused by snow, rain or dirt from the road, there may still be problems caused by moisture or dust in the automobile.

SUMMARY OF A PREFERRED EMBODIMENT OF THE INVENTION

An object of the present invention is to provide a video camera which overcomes the above-mentioned drawbacks by preventing bad pictures of scenes due to snow, rain or dirt on the windshield or lens which could affect the operability of the system.

In accordance with this invention, a video camera for an automobile comprises an arm mounted in said automobile to support a rear view mirror, a video camera supported by said arm to take pictures through a front glass windshield, a boot placed between said video camera and said front glass windshield, and an air passage connecting said boot with an air conditioner unit.

In accordance with this invention, a video camera is supported by the arm which also supports the rear view mirror. The video camera takes pictures of scenes in front of the automobile from inside the automobile so that the lens of the video camera is isolated from bad conditions caused by snow, dirt, moisture or rain. If it rains, the wipers clear the front glass windshield to provide a clear vision through the front glass windshield. A boot between the vide camera and the front glass protects the lens of the camera from dirt or moisture inside the automobile. Thus, a cleaning of the lens may not be necessary and this reduces the maintenance labor. Furthermore, this invention provides the air passage which connects the boot with an air conditioner within the automobile. Dry air is sent to the inside of the boot from the air conditioner so that the air prevents the lens from fogging up. Therefore, in accordance with this invention, the video camera can take good pictures through the front glass windshield without being disturbed by dirt, rain or moisture.

BRIEF DESCRIPTION OF THE DRAWINGS

The objects and advantages of the invention will become apparent from the following detailed description of a preferred embodiment thereof in connection with the accompanying drawings in which.

DETAILED DESCRIPTION OF THE INVENTION

Figure 1:
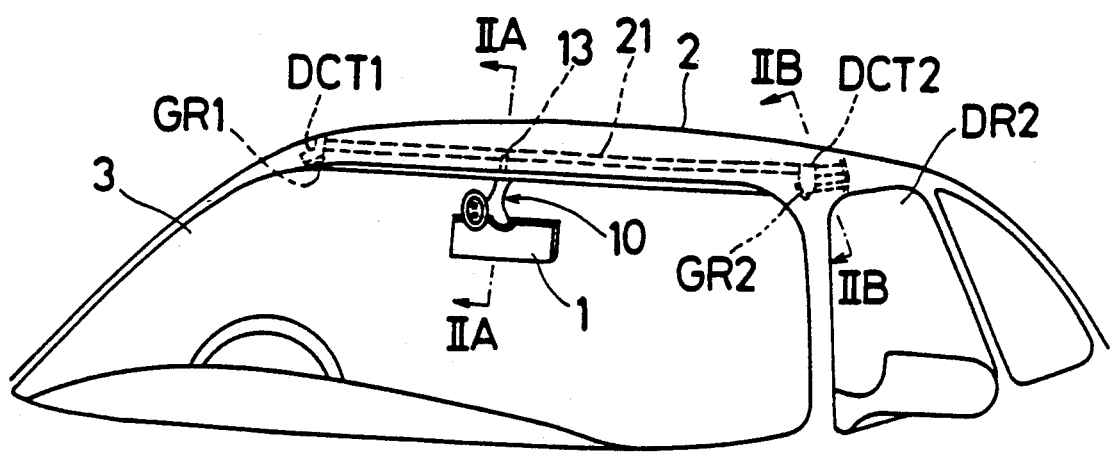
FIG. 1 is a front view of an automobile having with a video camera mounted in accordance with the present invention.
Figure 2A:
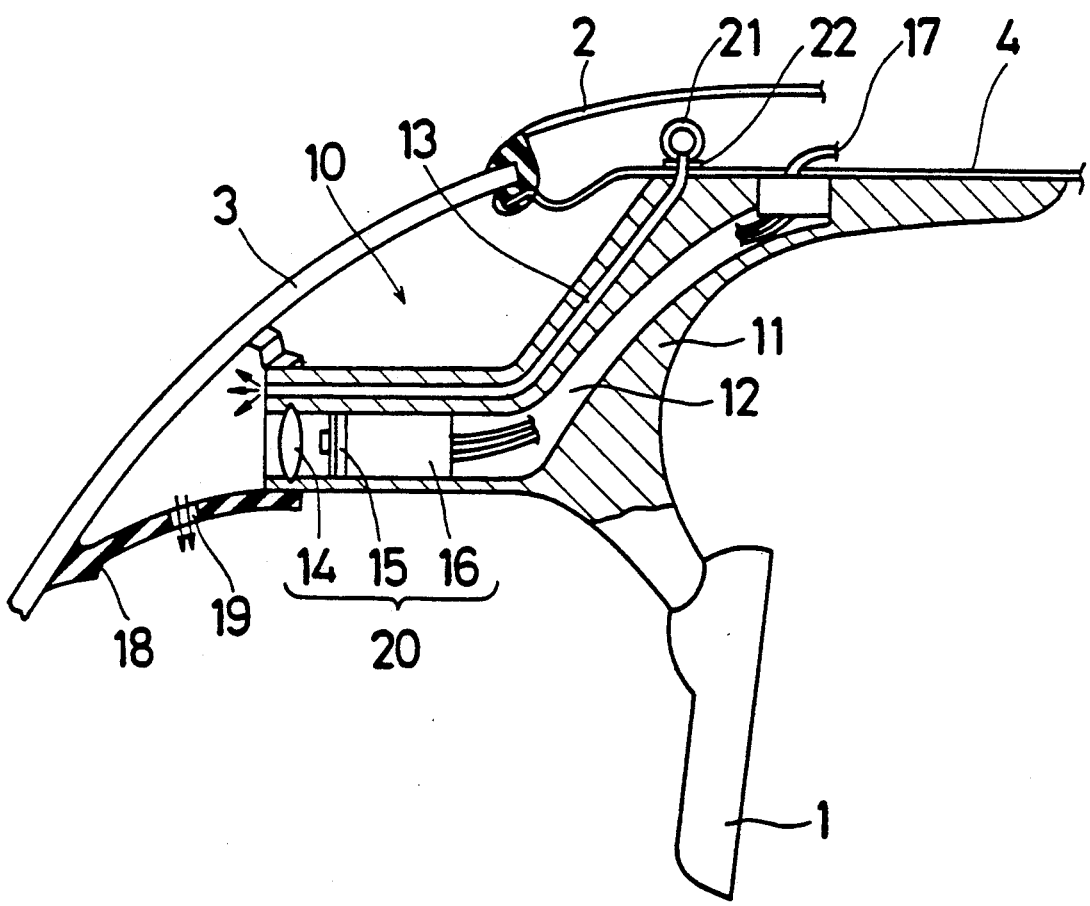
FIG. 2a is a cross-sectional view of the automobile along the line IIA—IIA in FIG. 1.

As shown in FIG. 1, a video camera is mounted in the arm 11 which also supports the rear view mirror 1. Referring to FIG. 2a, the arm 11 has a "H" shape and is provided with a passage 12 for the electric cables of the video camera 20 and a passage 13 for air. A downward projection of the arm 11 supports the rear view mirror 1.

The end portion of the passage 12 towards the front windshield 3 has a larger diameter and the video camera 20 is mounted in that portion of the passage 12. The video camera 20 includes a lens 14, a video device 15 and a signal processing unit 16. The cable 17 from the signal processing unit 16 extends through a narrow diameter portion of the passage 12 into the space between the roof 2 and the ceiling 4. The cable 17 is further connected to an image processing device (not shown) mounted on the automobile for further processing.

The upper end of the air passage 13 is connected with an air pipe 21 by a connector 22 and the air pipe 21 is connected to a conventional air conditioner unit (not shown). The other end of the air passage 13 opens into a boot 18 and is directed towards the front glass windshield 3.

The boot 18 is connected to an end of the arm 11 and the other end of the boot 18 is pressed against the windshield 3. The boot 18 defines a closed chamber with the windshield 3 so the video camera 20 is isolated from both the outside atmosphere and the inside atmosphere of the automobile.

The boot 18 has a small opening 19 through which air sent from the air passage 13 into the boot 18 is evacuated. This air flow coming in from the air passage 13 and going out through the opening 19 takes the moisture inside the boot 18 away. This prevents the lens 14 and the front glass windshield 3 from fogging up due to the humidity.

The boot 18 is made of synthetic material so that the boot 18 absorbs the vibrations of the arm 11 and the front glass windshield 3.

Figure 2B:
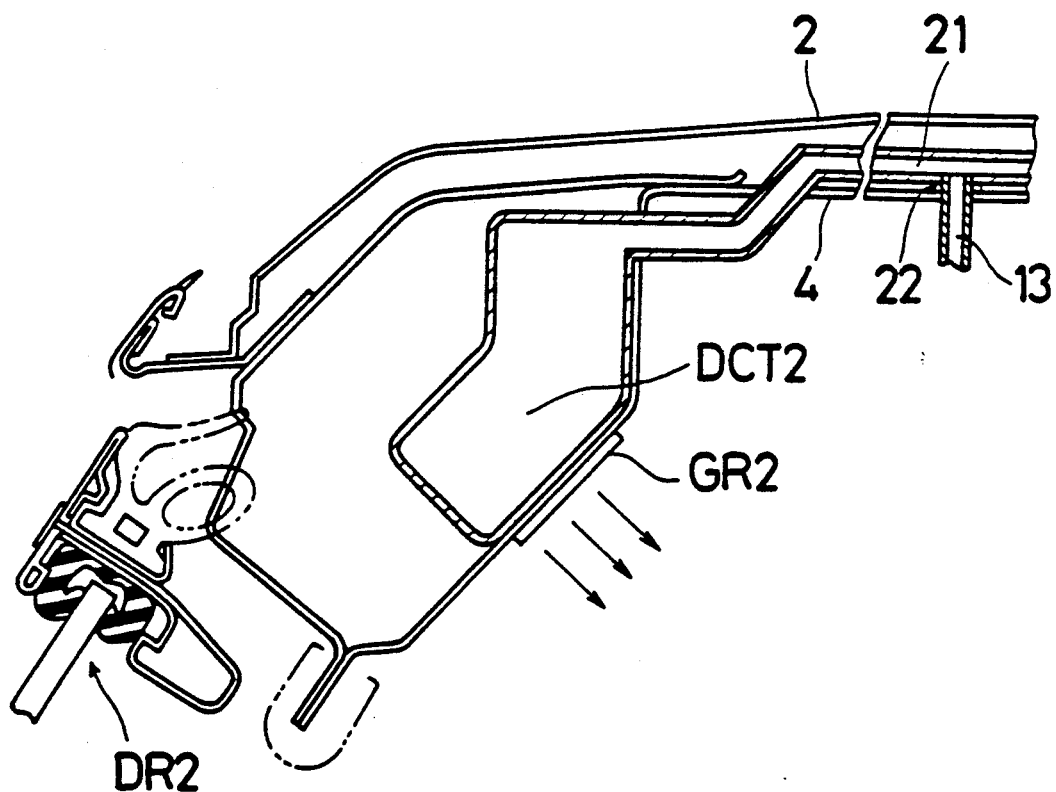
FIG. 2b is a cross-sectional view of the automobile along the line IIB—IIB in FIG. 1.

FIG. 2b shows a duct connection in the automobile. When a damper (not shown) is opened, the conditioned air blows out from grills GR1 and GR2 through ducts DCT1 and DCT2. The grill GR1 covers the driver's side and the grill GR2 covers the passenger's side. The air pipe 21 is placed between a roof 2 and an interior ceiling 4 and is connected to the duct DCT1 and duct DCT2. The passage 13 of the arm 11 is also connected to the air pipe 21.

Figure 3:
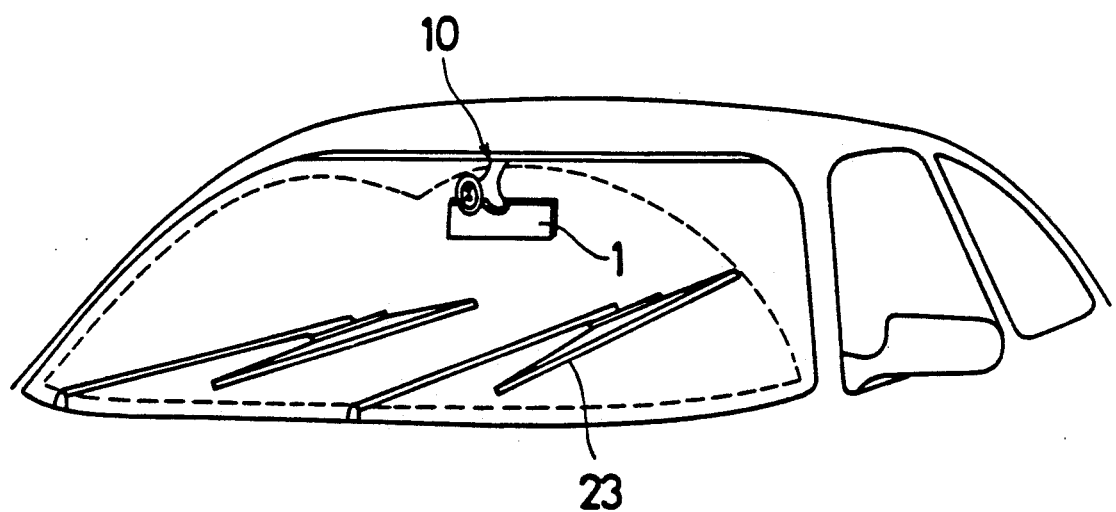
FIG. 3 is a front view of the automobile showing the area covered by the windshield wipers.

As shown in FIG. 3, the video camera 20 is set to shoot scenes through the front glass windshield 3 through an area covered by the wipers 23. The wipers 23 clean the front glass windshield 3 when it rains or the front glass is dirty so the video camera 20 is provided with good visibility through the front glass windshield 3.

Although the invention has been described in connection with preferred embodiment thereof, it will be appreciated by those skilled in the art that additions, substitutions, modifications, and deletions not specifically described, may be made without departing from the spirit and scope of the invention as defined in the appended claims.

What is claimed is:

1. A video camera for an automobile comprising:
   an arm adapted to be mounted in an automobile to support a rear view mirror,
   a video camera mounted on said arm in a position to take pictures through a front glass windshield,
   a boot connected between said video camera and said front glass windshield, and
   an air passage adapted to connect said boot with an air conditioner.

2. A video camera as set forth in claim 1, wherein said air passage extends through said arm with an end of the passage in communication with said boot.

3. A video camera as set forth in claim 2, further comprising another passage extending through said arm through which cables may be connected to said video camera.